United States Patent [19]

Gray

[11] Patent Number: 5,071,102

[45] Date of Patent: Dec. 10, 1991

[54] PIPE CRIMPING TOOL

[76] Inventor: Rommie Gray, P.O. Box 1285, Pawleys Island, S.C. 29585

[21] Appl. No.: 482,080

[22] Filed: Feb. 20, 1990

Related U.S. Application Data

[63] Continuation of Ser. No. 221,619, Jul. 20, 1988, abandoned.

[51] Int. Cl.5 .............................................. F16K 7/02
[52] U.S. Cl. ........................................... 251/4; 251/9
[58] Field of Search ...................................... 651/4, 9

[56] References Cited

U.S. PATENT DOCUMENTS

| | | | |
|---|---|---|---|
| 788,603 | 5/1905 | Rowell | 251/9 |
| 2,064,919 | 12/1936 | Kellam | 251/9 |
| 2,197,310 | 4/1940 | Lincoln | 251/9 X |
| 3,408,034 | 10/1968 | Lau | 251/9 |
| 4,164,223 | 8/1978 | Munib | 251/6 |

Primary Examiner—John C. Fox
Attorney, Agent, or Firm—B. Craig Killough

[57] ABSTRACT

A pipe crimping tool which may be used to temporarily interrupt the flow of gas or liquid material through resilient pipe is characterized by jaws having a curved surface at the point of contact with a pipe, and a means, such as handles, for actuating the jaws to apply pressure to a pipe so as to restrict the flow of liquid or gas material through the pipe.

8 Claims, 1 Drawing Sheet

PIPE CRIMPING TOOL

This is a continuation of application Ser. No. 07/221,619, filed July 20, 1988, now abandoned.

BACKGROUND AND SUMMARY OF THE INVENTION

This invention relates to tools generally, and is specifically directed to a tool which may be used to crimp certain types of pipe to prevent the flow of liquid or gaseous material through the pipe for the purpose of performing maintenance or modification to pipes or piping systems.

Pipes are used to convey various materials. These materials may be gases or liquids, and such piping systems are commonly used by private and public utilities. Piping systems as contemplated herein are public water systems, natural gas systems and other delivery systems for delivering gas and liquid materials.

Pipes made of various resilient materials are in modern use for such systems. Factors such as weight, cost, and corrosion resistance have made such pipes common in their application in pipe systems as described above. A common material from which such pipes are made is polybutylene.

It becomes desirable from time to time to stop the flow of material being delivered through the pipe. Reasons for stopping the flow of such material may include repair, maintenance, modification or expansion of the system. For example, if a metering device is to be placed within the line, the flow of material through the pipe must be disrupted to allow the installation of such a meter. In the case of breakage of a pipe, temporary disruption of the flow of the material is desirable so that the pipe may be repaired.

Heretofore it has been necessary to stop the flow of material through the pipe, or to plug the pipe and place a valve into the pipe line. Stopping the flow of material through the pipe may result in service interruption to a much broader area than would be necessary if the material flow could be stopped at the single desired point. For example, to install a meter at a consumer residence, it might be necessary to temporarily stop service to many consumers to perform the service. Likewise, it may be necessary to interrupt service even for the purpose of plugging the pipe, or inserting a valve into the pipe system. Furthermore, these methods are time consuming.

SUMMARY OF THE PRESENT INVENTION

The present invention provides a tool which can crimp resilient pipe, such as polybutylene pipe, so that service interruption may be made at exactly the desired point or points for repair, servicing, modification or expansion of a pipe system. The flow of material through the pipe may be accomplished as desired, and the pipe crimping tool may be quickly and easily applied at the desired point to interrupt the flow of material through the pipe only at that point. Once the tool is released, the pipe, due to its resilient nature, regains its original shape, with no damage to the pipe.

The invention comprises jaws which squeeze a pipe on each side of the pipe so as to totally restrict the flow of material through the pipe. Pivoting handles are used to actuate the jaws so as to squeeze the pipe, and a locking means may be provided to hold the jaws in position so as to fully restrict the flow of material through the pipe. In the preferred embodiment, the jaws are cylindrical in shape.

DETAILED DESCRIPTION OF THE PREFERRED EMBODIMENT

The present invention incorporates jaws 2 which may be actuated by means such as pivoting handles 4 so as to squeeze, or crimp, resilient pipe 6 so as to totally restrict the flow of gas or liquid material through the pipe. The jaws 2 of the device are placed over opposite sides of the pipe 6.

In the preferred embodiment, these jaws 2 are generally cylindrical in shape, or have a curved surface where the jaws contact the pipe. The cylindrical shape will accomplish the required crimping of the pipe so as to fully restrict the flow of material through the pipe, while not causing excessive force to be placed at one particular point on the pipe, which may cause damage to the pipe. For example, if the jaws were flat planes, a greater amount of force would be concentrated over a relatively Small area at the pipe, which could cause permanent damage to the pipe. The cylindrical shape causes the pipe to bend on the circumference of the cylindrical jaws, allowing the resilient pipe to retain its original shape without permanent damage.

In the preferred embodiment, the jaws 2 are actuated by means of pivoting handles 4. Virtually any means which would cause the jaws 2 to move toward each other until they are touching, or virtually touching, could be employed. The handles 4, as shown, allow the jaws to be moved away from each other so as to place the jaws on either side of a pipe. Squeezing or pushing the handles toward each other causes the jaws to press the pipe from either side, so as to crimp the pipe. As the handles are moved away from each other, the jaws pivot around and away from the pipe so that the flow of material through the pipe can be restored, and so that the tool may be taken away from the pipe.

Figure 2:
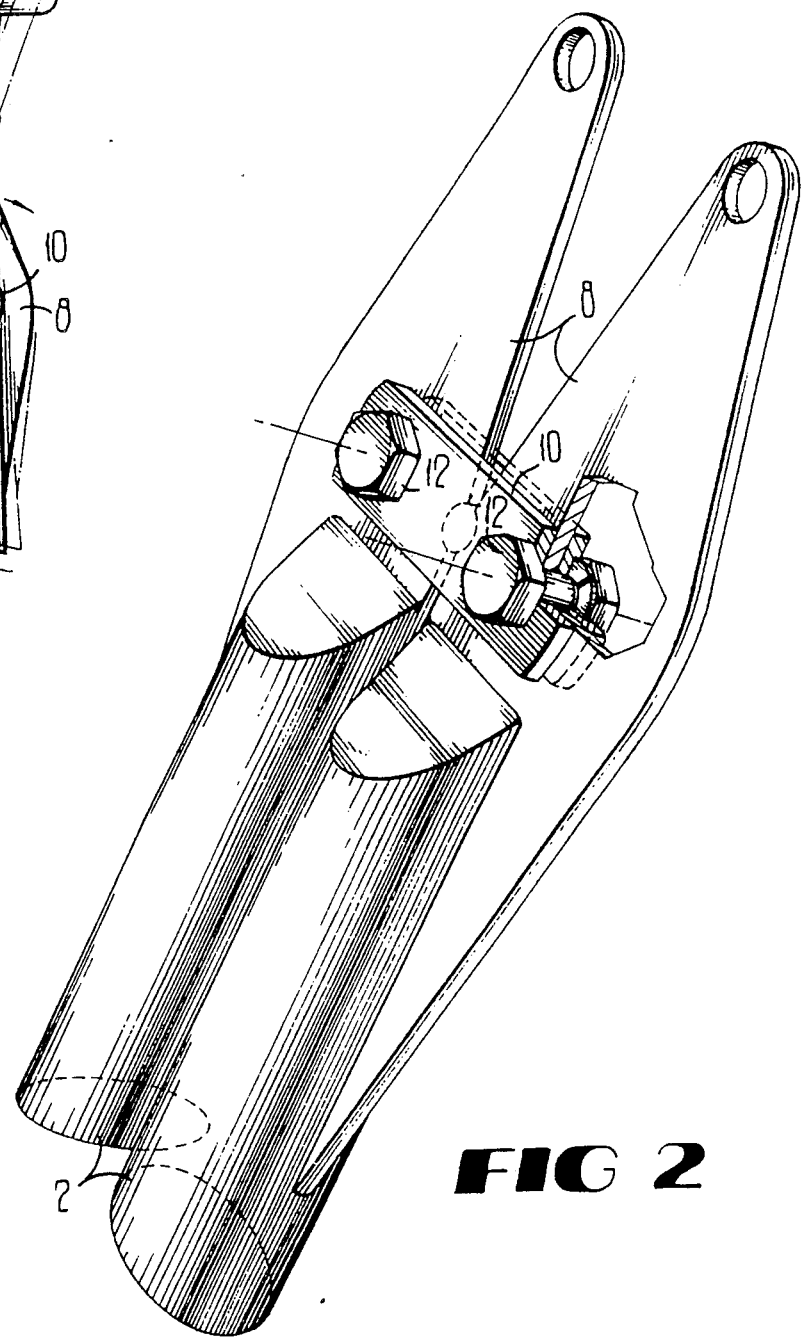
FIG. 2 is an enlarged isolation of the jaws of the tool.

In their particular construction, as shown in FIG. 2, the jaws are generally cylindrical in shape. These jaws 2 may be constructed of steel or other hard material which can apply sufficient pressure to crimp the subject pipe. In the preferred embodiment, these generally cylindrical jaws are connected to flat planes 8, which are connected to each other by means which allows pivoting for moving the jaws. As shown in FIG. 2, the pivoting means may simply be a connecting plate 10 secured into each of the planes by fasteners 12 which will allow the jaw assembly to pivot.

Handles 4 are attached to the flat planes 8, and are secured so as to actuate the jaws 2. The locking means 14 is provided so as to hold the jaws in the closed position so as to crimp the pipe and hold it while service or repair is performed. This locking means may simply be a flat bar 14 which pivots on one handle and locks into place on the opposite handle so as to hold the jaws in the closed relationship as shown in FIG 1.

In its most common application, the present invention will be used to crimp underground pipes. Accordingly, dirt and other materials will, by other means, be extracted from above the buried pipe to allow access to the pipe. The tool will then be located on either side of the pipe as shown in FIG. 1. However, it is unlikely that dirt or earth will be removed from a level which is lower than the bottom pipe, or if dirt is removed from lower than such a level, the natural tendency of the user will be to lower the pipe crimping tool until it strikes earth.

Figure 1:
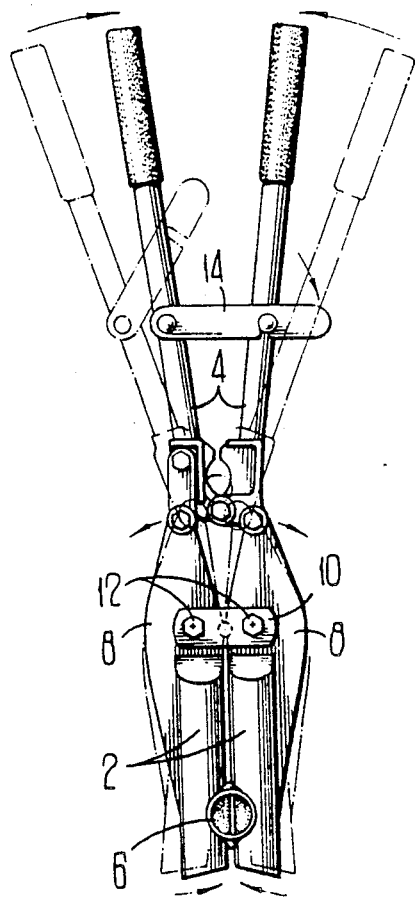
FIG. 1 is an elevated, action view showing the pipe crimping tool in its entirety, and showing the pivoting action of the handle so as to cause the jaws to be actuated and to apply pressure to the pipe so as to crimp the pipe.

As the cylindrical jaws swing through the arc which is shown in FIG. 1 so as to close, it is desirable that the leading edge of the lower surface of the jaws not strike dirt in a manner which will impede the closure of the tool. Accordingly, the jaws are angled, or tapered, on the lower surfaces as shown in FIGS. 1 and 2. As the jaws move through their arc, and closure of the tool is performed so as to crimp the pipe, this angle, or taper, of the jaw ends aid in preventing the leading edge of the jaws from contacting dirt so as to obstruct the movement of the device. As is shown in the drawings, the plane of the bottom surface of the jaws forms an acute angle where it meets a vertical line drawn down the outside edge of each of the jaws.

What is claimed is:

1. A pipe crimping tool, comprising:
   a. a pair of jaws which may be actuated so as to open and receive a pipe between said pair of jaws, and which may be actuated so as to close said jaws and apply pressure to said pipe so as to crimp said pipe, wherein a plane formed by a bottom surface of each of said jaws meets an outside surface of said jaws at an acute angle; and
   b. means for actuating said jaws.

2. A pipe crimping tool as described in claim 1, wherein said jaws are cylindrical in shape.

3. A pipe crimping tool as described in claim 2, wherein each jaw of said pair of jaws is connected by means which allows said jaws to pivot relative to each other, and wherein said means for actuating said jaws is a pair of handles, with one of said handles attached to one of said jaws by means which will allow said handle to pivot relative to said jaw, with remaining handle attached to the remaining jaw by means which will allow said remaining handle to pivot relative to said jaw.

4. A pipe crimping tool as described in claim 3, wherein each of said jaws is connected to a flat plane, and wherein said flat planes pivot relative to each other, and wherein each handle of said pair of handles is attached in one of said flat planes by means which will allow each handle to pivot relative to said flat plane.

5. A pipe crimping tool, comprising:
   a. a pair of jaws which may be actuated so as to open and receive a pipe between said pair of jaws, and which may be actuated so as to close said jaws and apply pressure to said pipe so as to crimp said pipe, wherein a plane formed by a bottom surface of each of said jaws meets an outside surface of said jaws at an acute angle;
   b. a pair of flat planes, one of which is attached to each jaw of said pair of jaws, wherein said flat planes are pivotally connected to each other; and
   c. means for actuating said jaws.

6. A pipe crimping tool as described in claim 5, wherein said jaws are cylindrical in shape.

7. A pipe crimping tool as described in claim 6, wherein said means for actuating said jaws is a pair of handles, with one of said handles attached to one of said flat planes by means which will allow said handle to pivot relative to said flat plane, with the remaining handle attached to the remaining flat plane by means which will allow said remaining handle to pivot relative to said flat plane.

8. A pipe crimping tool as described in claim 5, wherein said means for actuating said jaws is a pair of handles, with one of said handles attached to one of said flat planes by means which will allow said handle to pivot relative to said flat plane, with the remaining handle attached to the remaining flat plane by means which will allow said remaining handle to pivot relative to said flat plane.

* * * * *